United States Patent
Kosheleff

(10) Patent No.: US 8,622,339 B2
(45) Date of Patent: Jan. 7, 2014

(54) MASS FLOW INCREASE AT TAKEOFF IN SUPERSONIC AIRLINER

(76) Inventor: Patrick A. Kosheleff, Yankee Hill, CA (US)

( * ) Notice: Subject to any disclaimer, the term of this patent is extended or adjusted under 35 U.S.C. 154(b) by 429 days.

(21) Appl. No.: 13/068,583

(22) Filed: May 16, 2011

(65) Prior Publication Data

US 2012/0292440 A1    Nov. 22, 2012

(51) Int. Cl.
*B64D 33/00* (2006.01)

(52) U.S. Cl.
USPC ............................... 244/53 R; 244/53 B

(58) Field of Classification Search
USPC ............... 244/53 R, 53 B; 137/15.1, 15.2
See application file for complete search history.

(56) References Cited

U.S. PATENT DOCUMENTS

| | | | |
|---|---|---|---|
| 3,161,019 A * | 12/1964 | Gregory et al. | 60/264 |
| 3,186,165 A * | 6/1965 | Pierpont | 60/226.1 |
| 3,678,690 A * | 7/1972 | Shohet et al. | 60/226.3 |
| 3,900,177 A * | 8/1975 | Calder et al. | 244/53 R |
| 5,301,901 A * | 4/1994 | Kutschenreuter, Jr. | 244/53 R |
| 8,292,217 B2 * | 10/2012 | Smith et al. | 244/53 B |

* cited by examiner

*Primary Examiner* — Christopher P Ellis

(57) ABSTRACT

In a supersonic aircraft, turbojet engine nacelles each containing two remote fans in the front half of the nacelle, for noise reduction at takeoff. During supersonic flight, a front wedge at the nacelle nose achieves external compression of intake air. The wedge is vertical, sending the airflow left and right inside the nacelle along its side walls. The two flows follow mirror image curved paths on their way to a turbojet, leaving unused space between them to house the fans in tandem. For takeoff, clutches connected to the turbojets's compressors are engaged. Driveshafts turn pinions against a gear on the same shaft as the remote fans. The fan output is discharged backward under the nacelle to produce thrust. The energy to turn the fans is taken from the turbojet cycle. The reduced exhaust jet velocity decreases its noise. Supercharging produces the extra power to turn the remote fans if multistage.

5 Claims, 5 Drawing Sheets

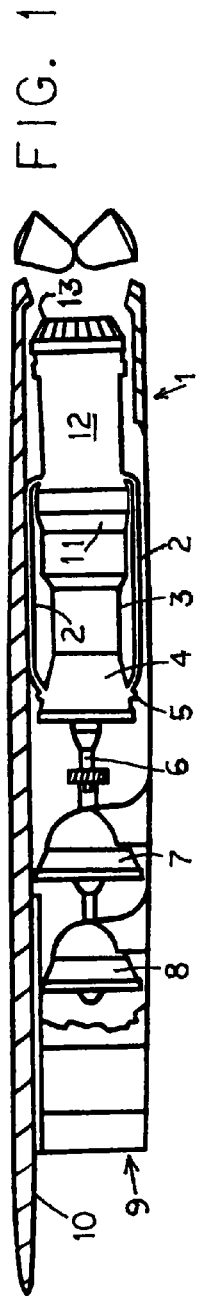
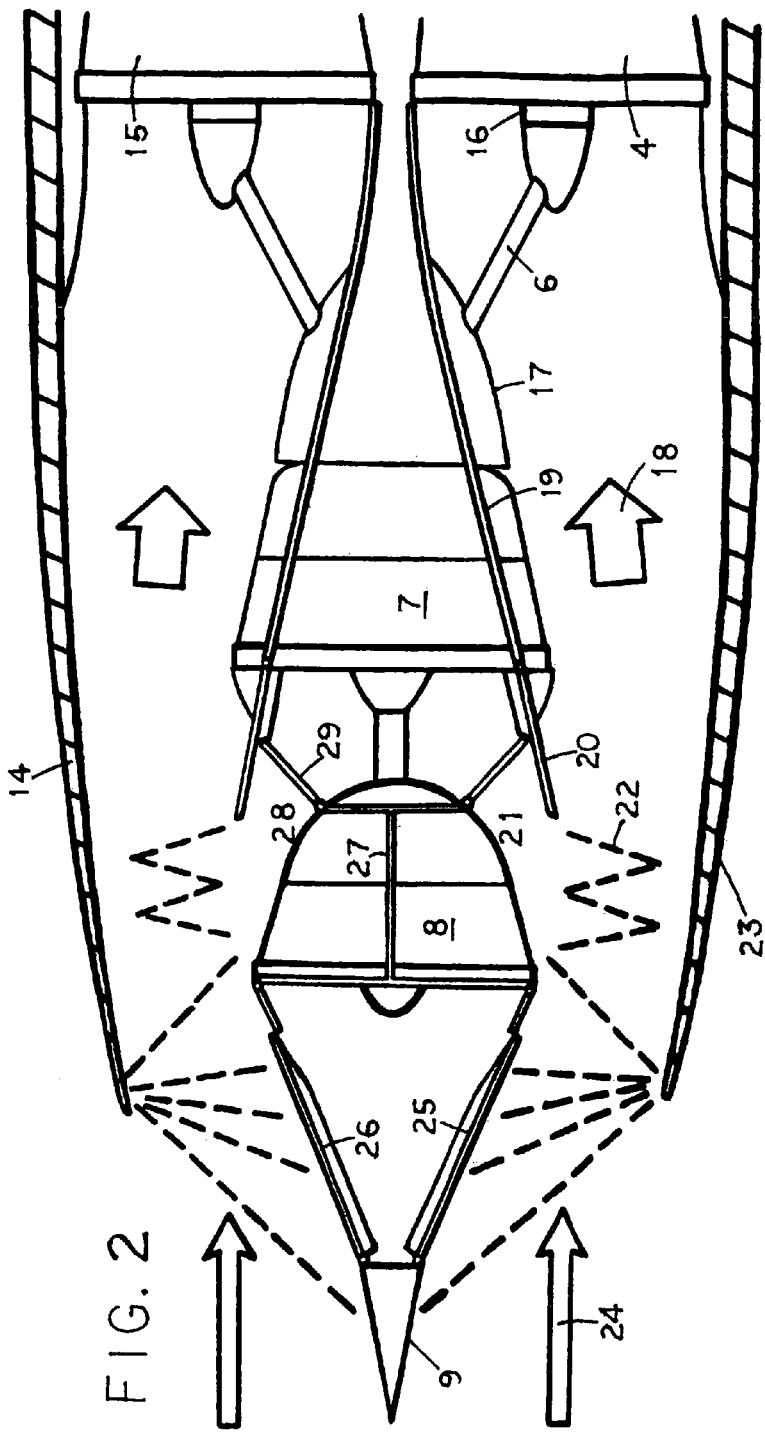

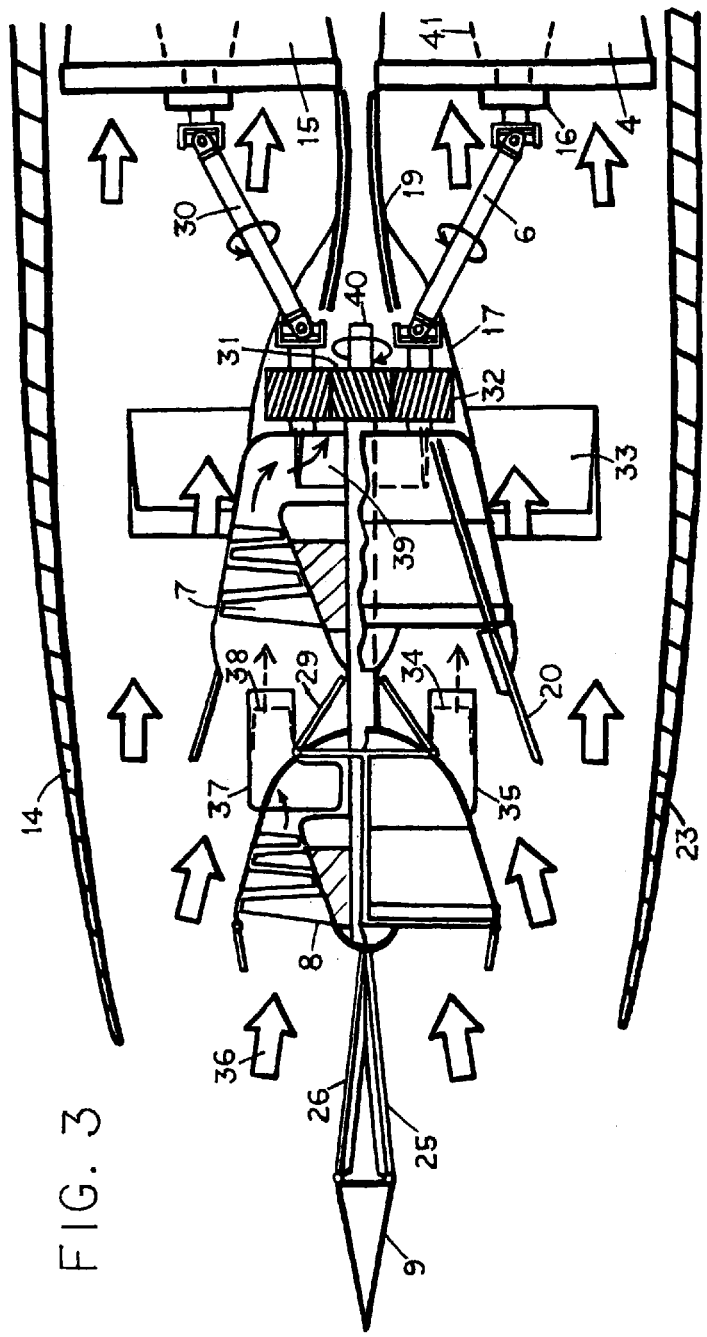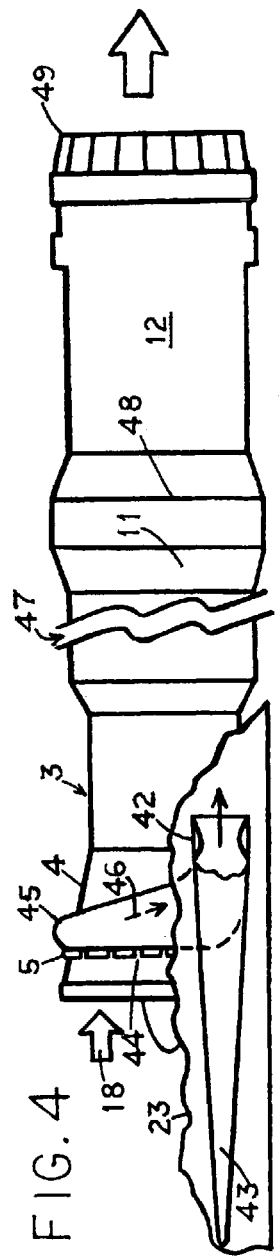
FIG. 3
FIG. 4

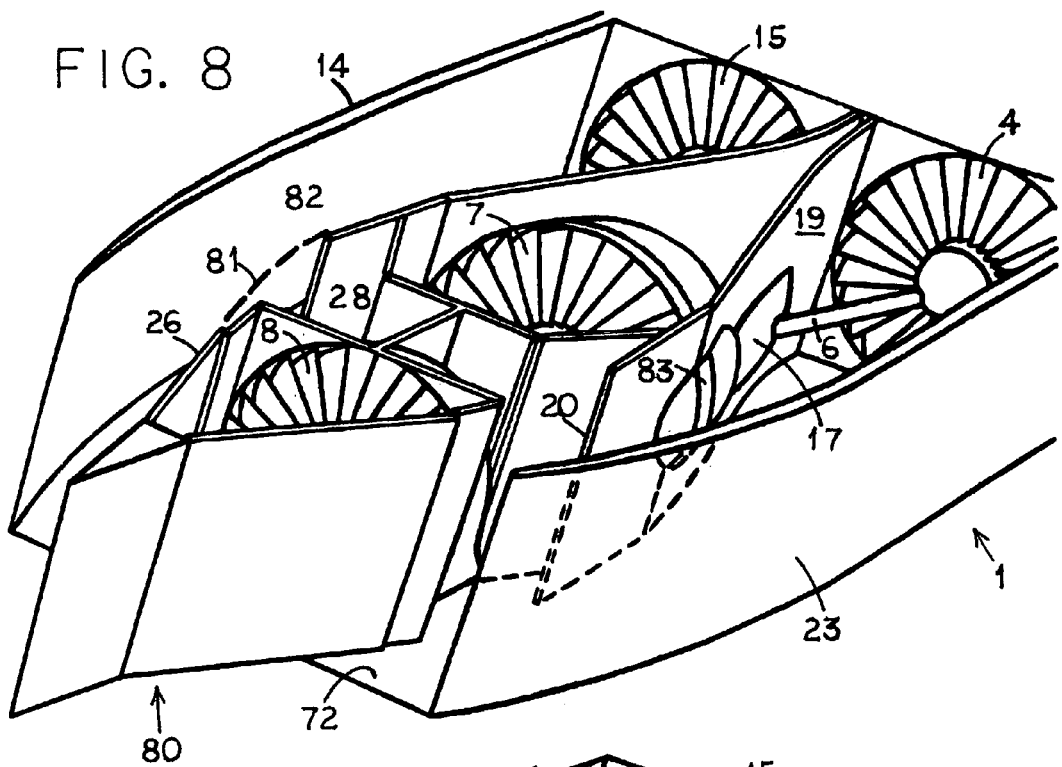
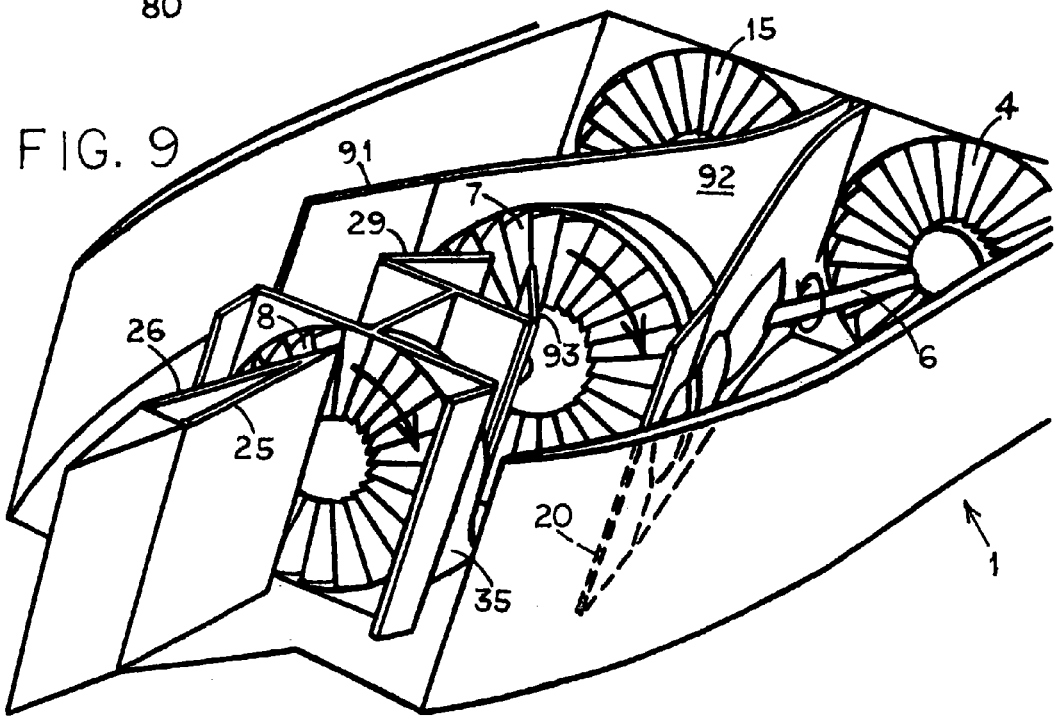

MASS FLOW INCREASE AT TAKEOFF IN SUPERSONIC AIRLINER

BACKGROUND OF THE INVENTION

In a supersonic aircraft powered by turbojets, remote fans are added ahead of the turbojets and connected to them by driveshafts which take some power from the compressor rotors. This doubles the airflow and decreases the jet exhaust velocity. A remote front fan is known in the art in U.S. Pat. No. 3,161,019. His FIG. 10 shows an auxiliary compressor 62 driven by a shaft 64 controlled by a crutch and connected to a gas turbine engine 15.

The engine nacelle is like the ones in Concorde Mach 2 airliner, a long flat box slung under a wing and containing two turbojets in the rear half. The front half of the nacelle houses the intake air ducts, again like Concorde. However, our nacelle's two intake air ducts are back-to-back, like those in the USAF B-1 bomber. The air ducts curve apart from each other in the middle, therefore that space is where the remote fans are housed.

In the B-1, the air intakes start with wedge-shaped external-shock inlets (JANE's All The World's Aircraft, 1977-78, page 389.) The wedges flare left and right from a vertical knife-edge to achieve external compression by oblique shocks to the sides. We do the same. The wedges can be seen in FIGS. 2 and 3 of Paper 730348, Society of Automotive Engineers ("SAE"), also in SAE Transactions, Vol. 82, 1973, page 1139. With the airflow directed to the sides of the nacelle, a central volume of unused space is created. A similar layout is seen in Option 2 on page 43 of Mechanical Engineering, November 1962. The central volume of unused space is the lozenge-shaped grey area between two air ducts in white. In our invention, the lozenge space is where the two remote fans are located, one for each turbojet engine. The lozenge space is long, so the fans are installed in tandem. No example of this was found in the art.

The tandem fans are shaft-driven from a central gear turned by pinions connected to driveshafts extending from the turbojets. Gear drive of remote fans is in FIG. 8 of U.S. Pat. No. 3,161,019. Our fan output ejects from the nacelle bottom to produce forward thrust. Doors similar to door 35 in U.S. Pat. No. 3,900,177 will open downward from the nacelle floor, except they would be turned 180 degrees to point backward.

Driving the new fans takes some additional power from the low pressure ("LP") turbines of the turbojet engines. It is known to open the exhaust nozzles more than the correct setting for generating maximum jet thrust. This causes a drop in the pressure within the jet pipes. The working gas flowing through the turbines undergoes greater expansion and produces more shaft work. An early example for turning a large remote rotor is U.S. Pat. No. 2,940,691. A similar instance is U.S. Pat. No. 3,678,690. A closer example is nozzle opening variation behind the LP turbine which turns a fan in U.S. Pat. No. 3,186,165.

Our two-stage remote fans take more energy to turn than single-stage units. The pressure in the jet pipe would fall too low for good turbine efficiency. More power is needed. We supercharge the turbojets during takeoff. 15% extra flow in the LP compressor of the turbojet in Concorde has been explored (SAE Paper 800732, also in SAE Transactions, Vol. 89, 1980, pages 2276, 2278, and 2280.) Its pressure ratio had to increase so that the high pressure ("HP") compressor didn't have to be enlarged (page 2276; Note 2 on page 2281.) But in our case, the higher pressure ratio is not wanted at cruise.

A solution is to bypass the extra flow and route it to the jet pipe. This is known in the art, U.S. Pat. No. 3,070,131. His valve 34 controls the action. An alternative embodiment is to discharge the bypass flow through a secondary nozzle immediately at the side of the engine during cruise flight: Similar to the vectored thrust nozzles in the Pegasus VTOL engine (JANE's All The World's Aircraft 1987-88, page 935,) except that one flows all the time. We control the flow with a valve. FIGS. 3 and 6 of U.S. Pat. No. 3,280,560 are related.

SUMMARY OF THE INVENTION

In a supersonic aircraft powered by turbojets, equipment to reduce takeoff noise by doubling air mass flow and decreasing the exhaust jet velocity. Remote fans in the front half of the engine nacelle are powered by driveshafts turned by the compressor rotors of the turbojets. The fan discharges are below the nacelle floor. Clutches disable the fans during supersonic flight. The nacelle front half conventionally contains two large air ducts, each of which feeds intake air to a turbojet in the rear half of the nacelle.

At the nacelle nose, a vertical wedge forms external compression ramps for the high-speed intake air during supersonic flight. The wedge divides the airflow, sending half of it to the left and half to the right. Each airflow path continues on a curved trajectory hugging a side wall on the inside of the nacelle. Between the intake air flow paths is a lozenge-like unused volume in the middle of the nacelle. The two remote fans are installed in tandem within the volume, out of the way of intake airflow during supersonic cruise flight.

For takeoff, the wedge folds closed to admit intake air to the front fan, and hinged panels ahead of the rear fan swing open to capture the airflow for the rear fan. Clutches at the front of the turbojet engage, turning the driveshafts which extend forward to pinions in mesh with a central gear. The gear is on a shaft carrying the remote fans, which turn. They discharge lightly compressed air below the nacelle in a backward direction to produce forward thrust with relatively low noise.

The energy to drive the remote fans is taken from the turbojet cycle. The exhaust nozzles are opened wider than for greatest exhaust jet velocity. The pressures in the jet pipes are reduced. The turbojets's turbines expand the working gas more than usual, generating extra shaft work. That work turns the remote fans. As a further consequence, the reduced pressure in the jet pipe causes decreased jet velocity out of the exhaust nozzles. That reduces jet noise at takeoff too.

Selective supercharging is introduced to increase the turbine work still more during takeoff if the remote fans have a pressure ratio of 2:1 or more. Supercharging is disabled during cruise flight, with the LP compressor bypass flow going to the jet pipe. An alternative bypass flow discharge nozzle, if used, releases the flow immediately at the side of the nacelle.

BRIEF DESCRIPTION OF THE VIEWS

FIG. 1 is a side elevation of the contents of an engine nacelle.

FIG. 2 is a plan view of the nacelle set up for supersonic flight.

FIG. 3 is a plan view of the nacelle set up for takeoff.

FIG. 4 is a side elevation of the turbojet, showing at the rear a wide-open exhaust nozzle, and at the front a bypass flow nozzle.

FIG. 8 is an oblique perspective of the front half of the nacelle and its contents configured for supersonic flight.

FIG. 9 is an oblique perspective of the front half of the nacelle and its contents configured for takeoff.

DETAILED DESCRIPTION

Figure 5:
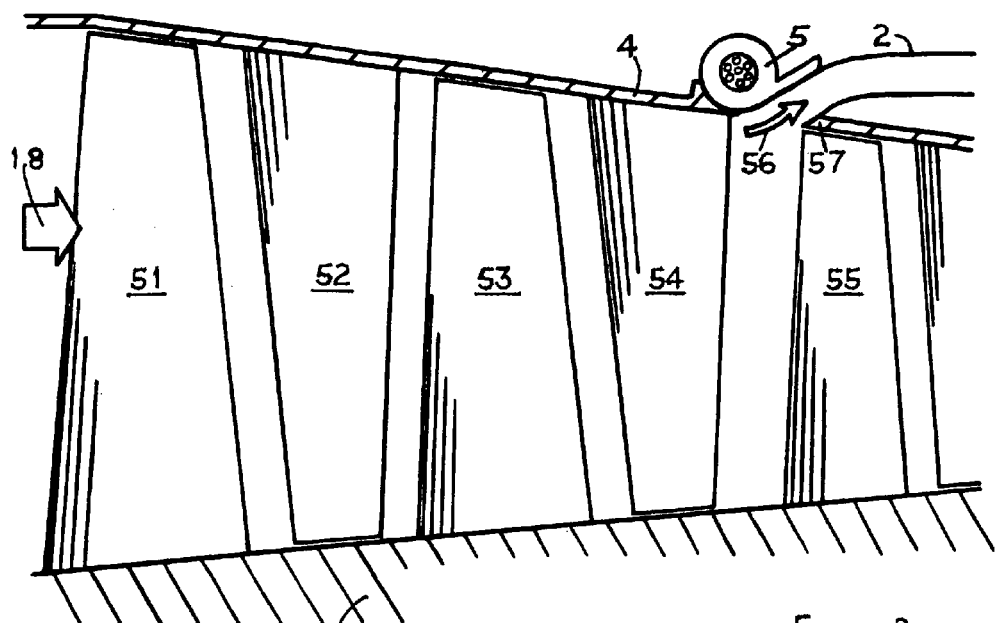
FIG. 5 is an elevation of the LP compressor with valved bypass.

This document applies to a supersonic airliner powered by turbojet engines. Turbojet engines provide efficient thrust at Mach 2 cruise, but are very noisy at takeoff because the jet exhaust velocity is high. A solution known in the art is to transfer some energy out of the turbojet cycle at takeoff an order to power a remote fan. The fan output is discharged for thrust independent of the turbojet. Total air mass flow can be doubled, while the turbojet's exhaust jet velocity is decreased. The net thrust stays the same, but the noise is reduced.

The invention is concerned with the engine nacelles and their contents. Each nacelle houses two turbojet engines. FIG. 1 is a side view of such a nacelle 1 with its side wall broken away to show the contents. Two-spool turbojet 3 is visible, with its low pressure ("LP") compressor 4 in front. Nacelle 1 is inspired by the example of the Concorde Mach 2 airliner because nacelle 1 similarly hangs below wing 10 seen in cross section. The new equipment is remote fans 7 and 8. Power to turn fans 7 and 8 comes from driveshaft 6 which is an extension of the rotor in LP compressor 4 of turbojet 3. Nacelle air intake 9 admits air destined for turbojet 3 and, sometimes, fans 7 and 8. There is a second, identical turbojet behind turbojet 3 and shown later, which also contributes shaft power to turn remote fans 7 and 8. The fans only turn during takeoff and some subsonic flight. But the first topic is nacelle configuration for Mach 2 cruise flight.

Supersonic Flight

FIG. 2 is an overhead view of the nacelle with wing 10 of FIG. 1 removed. The front of second turbojet 15 is seen, and it's the same as axial flow compressor 4 of the first turbojet. Nacelle side walls 14 and 23 bound the intake air passages for turbojets 4 and 15. FIG. 2 is for supersonic flight. Following the Concorde example, air flow 24 undergoes supersonic compression until normal shock 22, then is subsonic flow 18 on its way to turbojet 4. Clutch 16 is disengaged, driveshaft 6 does not turn, and neither do fans 7 and 8.

What does happen is that turbojets 4 and 15 develop thrust for cruise flight. Intake air 24 approaches the nacelle inlet at high speed. A main part of the inlet is surface 25 set at an angle to the flow. Intake air 24 impacting nose piece 9 and angled surface 25 produces a series of oblique shocks (dashed lines) terminating in a normal shock 22. This follows the practice in Concorde. The flow continues in the enlarging passage. This is subsonic diffuser flow 18. The flow velocity steadily decreases in exchange for higher pressure. In the end, diffused flow 18 will be slow enough, about 700 feet per second ("FPS"), to enter axial flow compressor 4 in normal fashion. Thus, the events in FIG. 2 are similar to what happens in the nacelles of the Concorde airliner at Mach 2, and axial flow compressor 4 could be the front of Concorde's Olympus 593 turbojet. The main difference so far is that the air passage for flow 24-18 is back-to-back with the flow passage at the top. In Concorde, the air flow passages are side-by-side.

The imaged "W" in dashed lines of the normal shock 22 complex occurs at the throat of the flow trajectory bounded by nacelle side wall 23. The flow trajectory follows the long air passage which starts with nose piece 9 and ends with the front face of axial compressor 4. Thus, the airflow trajectory is bounded by nacelle side wall 23 on the outside, and nose piece 9, angled surface 25, hinged panel 20, and subsonic diffuser wall 19 on the inside. The break between angled surface 25 and hinged panel 20 is an opening, like the one in Concorde's airflow path, which creates a plenum volume 21 for flow adjustment. (Numbers 21, 28 without leaders or underlines signify a volume.) Volume 21 includes some space above front fan 8 too.

Just below nacelle side wall 14 at the top is the second flow passage which is, a mirror image of the one just described. It feeds second turbojet 15. Pivoted dam 29 is a wall of mirror image plenum 28. Plenum volume 28 is kept separate from plenum 21 by fixed dam 27. The abutting plenums mean that the air ducts are back-to-back. Plenum 21 is conceptually part of the long void which forms on the inside of the turn of curved flow path 24-22-18.

The "wedge" created by angled surfaces 25, 26 (and nose piece 9) started the supersonic compression. To the right of the wedge is a dead-air space containing fans 7 and 8. It extends all the way to the right, incorporating plenums 21, 28, and the volumes ahead of and behind rear fan 7. Thus, an available volume was created whose envelope is triangular at the front (ahead of fan 8) and a frustum of a triangle around rear fan 7. This lozenge-like space (better seen in FIG. 8) houses remote fans 7 and 8. The idea was to keep fans 7 and 8 out of the curved air flow paths feeding turbojets 4 and 15 during supersonic flight.

An airflow trajectory is curved in the first place because intake air 24 hits nose piece 9 and angled surface 25 at an angle. This wedge not only compressed the air, but also threw it to the side. That only happens at supersonic speeds. At takeoff and climbout, which occur at low altitudes, there is no need for external compression. The whole configuration changes.

Takeoff and Climb

Figure 7:
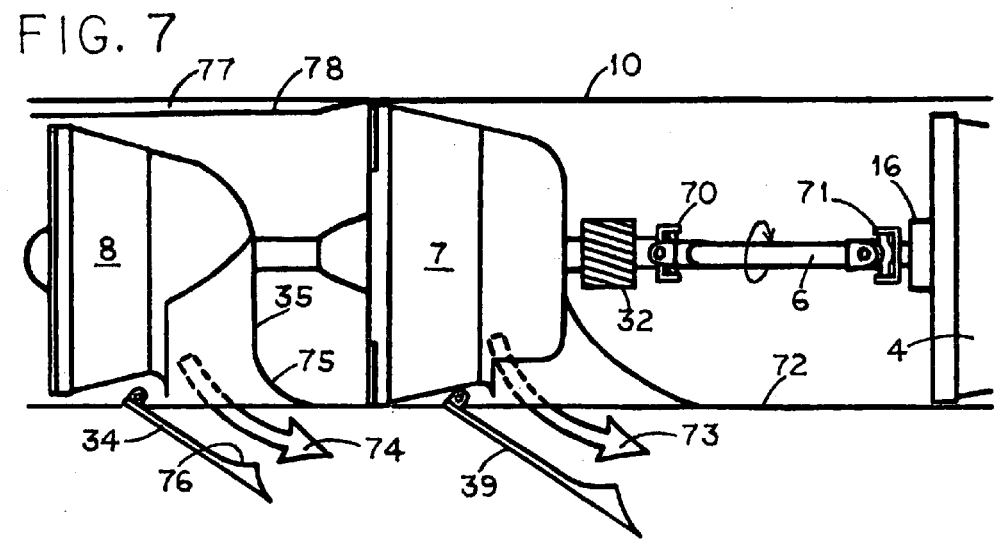
FIG. 7 is a side elevation of the remote fans in operation.

FIG. 3 is an overhead view like the preceding figure, but the components are deployed for subsonic flight. The main objective is to reduce noise during takeoff and climbout. That is when engine noise is most objectionable to the people near the airport. Exhaust jet noise is reduced by taking some power from the turbojets and using it to turn the remote fans. Clutch 16 is adjacent to LP compressor rotor 41 which is rotating at high speed. Clutch 16 engages, connecting driveshaft 6 to compressor rotor 41. A similar thing happens at the top with turbojet 15. Driveshafts 6 and 30 rotate rapidly. Power is transmitted through gearing 32, 31 et al, turning common shaft 40. In this partly sectional view, front fan 8 is turning. Intake air 36 gets compressed. Compressed air is collected by chute 37. Door 38 in the nacelle floor has dropped open, releasing the compressed air backward to produce forward thrust. Similarly at chute 35, door 34 in the floor dropped open to let out its compressed air. This action is seen in FIG. 7, also door 39 which is open to let compressed air 73 out of rear fan 7. Back in FIG. 3, chute 35 and its twin, chute 37 are out to the sides of fan 8's housing so that their discharge doesn't hit the back of door 39.

Airflow 36 as the intake to front fan 8 is made possible by closing angled surfaces 25 and 26 to collapse the wedge. At the same time, hinged panel 20 swung more open to capture some air for rear fan 7. Since hinged panel 20 has swung closer to nacelle side wall 23, the airflow between the two meant for axial compressor 4 may be too little. Door 33 in the bottom of the nacelle can drop down, as shown, to admit more air. This feature is copied from Concorde too. Coordinating the air flow path to fan 7, air dam 29 pivoted inward to guide intake air into the center regions of rear fan 7. Possible blockage of the air passages to fan 7 by chutes 35 and 37 will be addressed later.

In FIG. 3, sheet metal cover 17 provides streamlining for pinion 32 and the U-joint between pinion 32 and driveshaft 6. A small hole in cover 17 is enough opening for driveshaft 6. At the top, similar equipment is provided for driveshaft 30 to turn its pinion. Thus, two turbojets turn two remote fans. Visibly, the air intakes of remote fans 7 and 8 add up to about the intake area of axial compressor 4 plus the area of the intake of second turbojet 15. This is how the total airflow is doubled at takeoff.

All the things in the top half of FIG. 3 are in principle the mirror image of the things in the lower half. This underlines the fact that the two intake air passages are back-to-back. In other words, the side-by-side intake air passages in a Concorde nacelle (for instance, FIGS. 5 and 7 of U.S. Pat. No. 3,186,661) have twisted 90° in opposite directions about their lengthwise axes. It is noted that nose piece 9, angled surface 25, hinged panel 20, and fixed diffuser wall 19 are basically taken from one air duct in a Concorde nacelle.

Throughout this text, the discussion focusses on only one nacelle, but of course there are two, one under each wing. Each nacelle houses two turbojets, and the nacelles are similar. What applies to one largely applies to both.

Remote Fans and their Drive

The invention aims to shoehorn two remote fans in one nacelle. Here is a brief look at fans. If single-stage, as in FIG. 1, recent fans can develop a pressure ratio up to 1.7 to 1 (JT10D/PW2000 or CFE738 in JANE's, 1987-88, pages 965, 983.) For two-stage fans like in our FIGS. 3 and 10, pressure ratios over 2 to 1 are easily obtained (F101 or NK-8 in same JANE's, pages 953 and 920.)

In FIG. 1, power to turn remote fans 7 and 8 by driveshaft 6 will come from increased expansion of combustion gas through turbine section 11 of turbojet 3. During subsonic flight as in FIG. 3, a simple change in FIG. 4 is just to open the exhaust nozzle to a more wide-open setting 49. With more nozzle area for working gas to flow through, the pressure in jet pipe 12 falls significantly. Then, working gas passing through turbine 11 is able to expand further. Turbine 11 now develops more power. That power is transmitted through driveshaft 6 of FIG. 3 and turns the remote fans.

The model for this method is the drawing and the legend of FIG. 2 in SAE Paper 730346, also in SAE Transactions, Vol. 82, 1973, page 1125. It was applied to re-fanned airliner engines.

In our FIG. 1, turbojet 3 is a 2-spool engine, with the numeral 3 pointing to the high pressure ("HP") compressor, and item 4 being the low pressure ("LP") compressor. Turbine 11 is then necessarily a 2-stage turbine. The LP turbine disc which turns the LP compressor 4 is the last in turbine section 11. Since it's closest to jet pipe 12, the LP turbine is the one affected by the model just quoted from SAE Paper 730346.

Fan Power and Turbine Work

The present analysis is concerned with two things: 1) The power absorbed by a remote fan 7 or 8; and 2) The extra power which can be extracted from the LP turbine as shaft work for turning those remote fans. For the first question, a thermodynamic chart for air compression is consulted. Likely pressure ratios of interest range from 1.7, the high performer for single-stage fans, to 2.2 since the NK-8 reference above gave 2.15. Fan work, as data pairs:

| 1.7-19 BTU/lb | 1.8-22.7 | 2.0-28.8 | 2.2-35.4. |
|---|---|---|---|

For the second question, first calculate the basic LP turbine work in the original Olympus 593 turbojet in production. This is obtained indirectly as the work of the original LP compressor. From JANE's, 1978-79, page 694, the overall pressure ratio at takeoff is 15.5 to 1. It gives a discharge pressure of (15.5)(14.7 psia)=228 psia. Using the air compression chart, the ideal work is 153 BTU/lb. With a compressors efficiency of 87.5% (FIG. 17, SAE Paper 800732, also in SAE Transactions, Vol. 89, 1980, pg. 2281), the actual work is 153/0.875=175 BTU/lb. Both HP and LP compressors are 7-stage. Stage work is about the same for all stages, so the LP compressor work is 175/2=87.5 BTU/lb.

The next step is to find a variant of the Olympus 593 in which the LP turbine work is known to be different. It can be used in a calculation using ratios, which relies on a comparison.

The manufacturer of the Olympus 593 turbojet has explored 15% more airflow through the engine by enlarging the blading in the first 3 stages of the LP compressor (same reference, page 2280.) Simultaneously, the greater airflow meant that the LP compressor's pressure ratio had to increase, the greater density needed by the HP compressor of unchanged size to handle the extra flow (same reference, page 2276; Note 2, page 2281.) That engine was designated "622" (page 2278.)

Calculating 622's greater turbine work is much easier by using version two of the 622 engine. On page 3 of SAE Paper 892237 (not in SAE Transactions), a larger zero-stage was added to the front of 593's LP compressor. Pumping 15% more air this way is simple to analyze. All the stages in an axial-flow compressor generate about the same temperature rise (although not the same pressure ratio), so therefore absorb about the same shaft work. Adding one stage to the 7-stage compressor raises its work to 8/7 of what it was. 15% more air through all the stages makes them all absorb 15% more shaft work. The LP turbine in engine 622 must therefore produce (8/7)(1.15)=1.315 times as much work as the 593 engine. That's the limit with a 1-stage LP turbine (1980 SAE Transactions, 1st paragraph, p. 2278.)

Using the 593 engine's compressor work, then the 622 engine's LP turbine generates (0.315)(87.5 BTU)=27.55 BTU more power. Now, that is more than enough to power a remote fan 7 or 8 with the optimal pressure ratio of 1.7 to 1 in a single stage. It was calculated earlier to need just 19 BTU/lb. A more advanced single-stage fan giving 1.8 to 1 could also be powered, since from the earlier data it needs 22.4 BTU/lb. Thus, a benchmark appears to have been reached, and the design exercise could end now. The only thing the designer would need to be aware of is that the exhaust nozzle requires the more wide-open setting 49 in FIG. 4 at takeoff. The material covered so far is in claim 1, which embodies the first object of the invention, to double the air mass flow at takeoff for less noise.

Fan and Turbine Development

Still, a closer look reveals room for improvement. Another technical exercise follows. From FIG. 26 of SAE Paper 751056, also in SAE Transactions, Vol. 84, 1975, page 2953, the exhaust jet velocity of the Olympus 593 turbojet with 17% afterburning at takeoff is 2900 feet per second ("FPS"). From a textbook on gas turbine engines, the exhaust jet temperature at the same conditions is some 1400° K, or 2060° F. That gives "k", the ratio of specific heats, "c", the speed of sound at 2060° F., and the Mach number of the jet exhaust. When the values are plugged into the formula for sonic flow through a nozzle, the exponent of the formula can be cleared, giving a pressure ratio of 2.64 in Concorde's jet pipes at takeoff. That seems about right in view of the nozzle pressure ratio of 2.6 given for the Olympus 301 in SAE Paper 690412 page 14 (not in SAE Transactions.)

Now 2.64 is much higher than the probable maximum pressure ratio of 1.7 available from our remote fans 7 or 8 if single-stage. One thing which our fans have in common with the 593 turbojets is the diameter of the front face. They were chosen the same, for equal airflows. That allows a rough calculation to be made. It is supposed that the extra pressure drop in jet pipe 12, which increases the turbine work for powering the fans, equals the pressure rise in a fan. We can factor out one pressure. 2.64/1.7=1.55, the approximate remaining pressure ratio in jet pipe 12 of FIG. 4. It seems OK but isn't. The jet temperature (1690° R) is several times the fan flow's (612° R), so the exhaust jet velocity will be much greater than the fan's discharge.

Increasing the pressure ratio of the fans is a solution, because it removes more energy from the turbojet's working gas. Thus, the choice of two-stage fans in FIG. 3, which are expected to produce a pressure ratio about 2.2 to 1.

2.2 to 1 gives about the best fan output flow velocity for takeoff. The air compression chart yields a discharge temperature of 664° R, from which the previous variables, "k" and "c" are derived. Plugging the required values into the nozzle flow formula and converting from the Mach number, a velocity of 1347 FPS is obtained. This is 46.5 percent of Concorde's jet exhaust velocity at takeoff of 2,900 FPS (884 meters/second.) Therefore, comparative noise would be $(0.465)^3$=1/10 as much. 1347 FPS is 412 meters/sec, close to the currently recommended value of 400 meters/second at takeoff (SAE Paper 901892, page 6; also Journal of Propulsion and Power, Vol 20, No. 1, January-February 2004, page 66.)

There is a new problem. Two-stage fans with a pressure ratio of 2.2 are a greater load than can be handled by the LP turbine as is. In the 593 engine, the single-stage LP turbine turned 7 stages of LP compressor, so it's highly loaded to begin with. Now during takeoff, it is asked to turn two more fan stages (a remote fan 7 or 8) whose load, previously calculated, was 35.4 BTU/lb. The extra LP turbine capacity, previously calculated, was 27.55 BTU/lb. That is not enough. Merely opening the exhaust nozzle in FIG. 4 even more than setting 49 won't work. The LP turbine becomes less efficient because the flow angles through the blades are wrong. So now, supercharging must be applied.

Supercharging

The extra power will come from the increased density through the turbine. The extraneous added load is 35.4−27.55=7.85 BTU/lb. This is 9% of the basic Olympus 593 LP compressor work of 87.5 BTU. 15% more airflow as in the 622 engine should handle it.

However, 15% extra flow in the 622 engine does not yield 15% more power. It may only give half as much, or 7.5% (Note 2 under FIG. 17 of SAE Paper 800732.) The reason is that the extra compression raised the compressor discharge temperature, therefore not quite as much fuel can be safely burned in the combustion chamber. If the power boost is indeed only half, then dropping the fan's pressure ratio to 2.15 to 1 reduces the fan work just enough. Alternatively, a small amount of water or methanol injection into the combustion chamber is a known method for briefly increasing the power of a gas turbine engine. It should bridge the difference between 7.5% and 9% power boost.

Takeoff Thrust

One final note. Turbojet 3's exhaust jet velocity must be 2900 FPS−1347 FPS (the fan flow velocity)=1553 FPS to maintain takeoff thrust: Higher still than 400 meters/second (1312 FPS). However, jet speed caused by high temperature is quieter than jet speed caused by high pressure (text for FIG. 26, SAE Paper 751056.) This is a welcome break. Thus, in this roundabout way, low noise at takeoff may still be achieved. The last equation can be made more accurate. Since thrust=mv, and mv=vm, we can write it this way: 1347m+1553m=2900m, the original Olympus 593 takeoff thrust. Thus, remote fan output complements the reduced turbojet thrust to restore the original takeoff thrust.

Fan Bypass

Doubled air mass flow with fans 7 and 8 can continue during climbout, or even subsonic cruise for long over-land routes. But in any case it is not wanted during supersonic flight. The moveable walls in FIG. 3 are positioned wrong for the supersonic compression seen in FIG. 2. The question then arises, what to do during supersonic cruise with the 15% added flow entering the larger, "622"-style LP compressor 4, which is obtained all the time.

In FIG. 1, one method is to "ignore" the 15% added air at supersonic cruise by routing it directly to jet pipe 12 through bypass duct 2 controlled by valve 5. This is similar to U.S. Pat. No. 3,070,131. During takeoff, when the extra flow is needed to generate more power to turn remote fans 7 and 8 with pressure ratio 2 to 1 or more, valve 5 closes and the added flow stays in turbojet 3. These actions are seen in FIGS. 5 and 6.

Bypass Valves

FIG. 5 is a lengthwise cross section of the front part of LP compressor 4 from FIG. 1. In FIG. 5, compressor rotor 41 carries a set of rotor blades 51, 53 and 55. Stator blades 52 and 54 are affixed to casing 4 and alternate with the rotor blades in a conventional manner. Airflow 18 as in FIG. 2 enters at left. FIG. 5 shows the events during supersonic flight. Valve 5 has turned counterclockwise to open up bypass tube 2. Casing nose 57 digs into the flow and helps divert a small fraction 56 of the air. Up to about 15% of the entering airflow 18 is diverted. This bleed flow of lightly compressed air leaves the compressor and enters bypass tube 2. The air proceeds directly to jet pipe 12 in FIG. 1. Bypass flow 56 isn't wasted by going directly to jet pipe 12. It just simulates a turbofan engine of very low bypass ratio.

Figure 6:
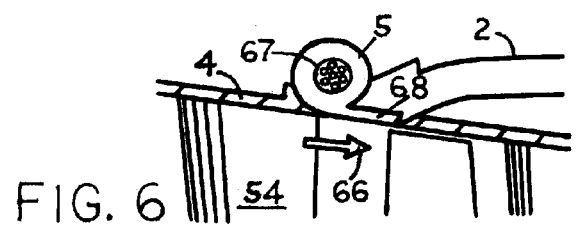
FIG. 6 is an inset of FIG. 5 with valved bypass closed at takeoff.

FIG. 6 shows the configuration within axial compressor 4 during takeoff. Valve 5 has turned clockwise to close bypass tube 2. Valve flap 68 performs the important task of restoring a smooth surface to the inside of casing 4. Flow 66 proceeds unchanged. This supercharges the turbojet by 15%, and the additional power turns fans 7 and 8 of 2 to 1 or more pressure ratio in FIG. 3.

Continuing with valve 5 action, in FIG. 4 there can be a whole ring of short, straight, cylindrical valve segments 5 around the circumference of casing 4. FIG. 4 shows only part of that ring, but it can continue all the way around. Metal webs 44 must be retained between any two valve segments 5 in order to keep the front of casing 4 attached to the rear. In FIG. 4, the valve segments 5 might be turned all together by cable 67 seen in FIG. 6. Cable 67, viewed in cross section, would make a circle just outside casing 4. In a way, it would imitate the function of flexible driveshaft 122 in U.S. Pat. No. 3,841,091. A possible arrangement is that there will be as many valve segments 5 as there are stator blades 54, say about 40. Then casing 4 would have the cross section at valve 5 of a 40-sided polygon resembling a circle.

The next three figures are a re-visiting of FIGS. 2 and 3 from different angles.

Fans and their Discharge

FIG. 7 is a side view of the rotating parts seen in FIG. 3. Side wall 23 of FIG. 3 has been removed, as well as hinged panel 20 and diffuser wall 19, in order to show fans 7 and 8 in action. As in FIG. 3, clutch 16 is engaged for takeoff. Driveshaft 6 turns pinion gear 32 which delivers half of the power to central gear 31 of FIG. 3. In FIG. 7, universal joints 70 and 71 accommodate the location of turbojet 4 offset to the near side. Fan 8's output is collected into scroll chute 35 and its twin, chute 37 of FIG. 3. In FIG. 7, lightly compressed air 74 is exhausted rearward to produce forward thrust. Trapdoor 34 dropped open to allow this. Curved ramp 76 cooperates with horizontal flare 75 to direct airflow 74 more backward than downward. These actions are duplicated at rear fan 7. Thus was attained doubled air mass flow.

There is a nacelle floor 72. The nacelle ceiling might be the bottom of wing 10, except at the front where splitter 77 rejects the wing's boundary layer. A thin dividing wall 78 may be the nacelle ceiling there. These features are imitated from Concorde.

Nacelle 3-D Views

FIG. 8 during supersonic flight is another look at FIG. 2 but from a different angle. Depth is added to show the volumetric qualities of nacelle 1. Side walls 14 and 23 are bounded on the bottom by nacelle floor 72. Wing 10 of FIG. 1 would go on top of side walls 14 and 23 to cover the enclosure. There would be a boundary layer splitter, as in Concorde, above wedge 80, but it is not shown. The invention rests on the fact that remote fans 7 and 8 fit in the lozenge-like island in the middle of nacelle 1. Then flow trajectory 82 inside an intake air duct can curve around fans 7 and 8 on its way toward turbojet 15. Similarly in the air duct for turbojet 4.

Streamlining 17, driveshaft 6, and bulge 83 are intrusions into the airflow whose effect will be looked at later.

There is a break in the contour of the walls which border flow trajectory 82. The large gap after the end of angled surface 26 is the access to plenum 28, which provides flow adjustment like in Concorde. The inside edge of supersonic flow just continues in a curved path 81, stabilized by the outward centrifugal force of making a turn at high speed. This follows the Concorde model. Flow path edge 81 is the free shear layer across which there is relatively little flow into plenum 28.

FIG. 9 shows nacelle 1 configured for subsonic flight like FIG. 3. Driveshaft 6 is turning, and so are remote fans 7 and 8. The driveshaft ahead of turbojet 15 is also turning, but obscured by rear wall 92. The main point of FIG. 9 is the changes in the orientation of the moveable walls which formed the lozenge-shaped central island of FIG. 8. In FIG. 9, these walls pivot on their hinges to trap some intake air for the remote fans: Angled surfaces 25 and 26 swing closed, and hinged panels 20, 91 swing wider. Pivoted walls 29 and 93 have turned inward to guide airflow toward the center of rear fan 7. All these actions are just the 3-D version of events seen in FIG. 3.

Turbojet Details

That concludes the description of the main features and operation of the invention. Two supplementary notes for FIG. 1 follow. A check valve should be inserted in bypass duct 2 to prevent the well known backflow at low RPM; as in U.S. Pat. No. 3,070,131. Secondly, axial-flow LP compressor 4 is shorter than the 7-stage unit in Concorde, to reflect the great advances since 1970 in stage pressure ratio. Five stages would be enough today. If the added bypass flow in duct 2 is less than 8% of Olympus 593 flow, no other change need be made to the engine. If the bypass flow is 15%, the only change needed is slightly taller blades in the LP turbine (SAE Paper 800-732/ SAE Transactions, 1980, Note 5 on page 2282.) In any case, the HP spool is left untouched. According to SAE Paper 760891, top of page 11 (not in SAE Transactions), this is an immense advantage in terms of development time and cost.

Exhaust Nozzle

An economy in exhaust nozzle development is obtained with the apparatus shown in the left half of FIG. 4. During cruise flight the 15% extra air captured by new axial compressor 4 is collected by spiral scroll 45. This bypass air is warm, not hot after just one or two stages of compression. Collected air 46 is exhausted directly to thrust out of nozzle 42 flush with side wall 23 (or the floor) of the nacelle. Streamlining 43 reduces forebody drag of nozzle 42 at cruise. Drawing break 47 marks the division of the figure. Mach 2 cruise is on the left, and subsonic flight is at the right. The use of warm-air nozzle 42 to discharge compressor bypass air for thrust means that the original exhaust nozzle 13 (of FIG. 1) from Concorde can be re-used without modification since it ignores the extra flow. Un-changed, it could not pass the extra flow because both the primary and secondary nozzles are already wide open at Mach 2 cruise in Concorde. The problem does not exist at takeoff because both nozzles are partly closed down (FIG. 8 in SAE Paper 710756, also in SAE Transactions, Vol. 80, 1971, page 2512.) The nozzles can just be opened slightly at takeoff.

Driveshaft Angle

Figure 10:
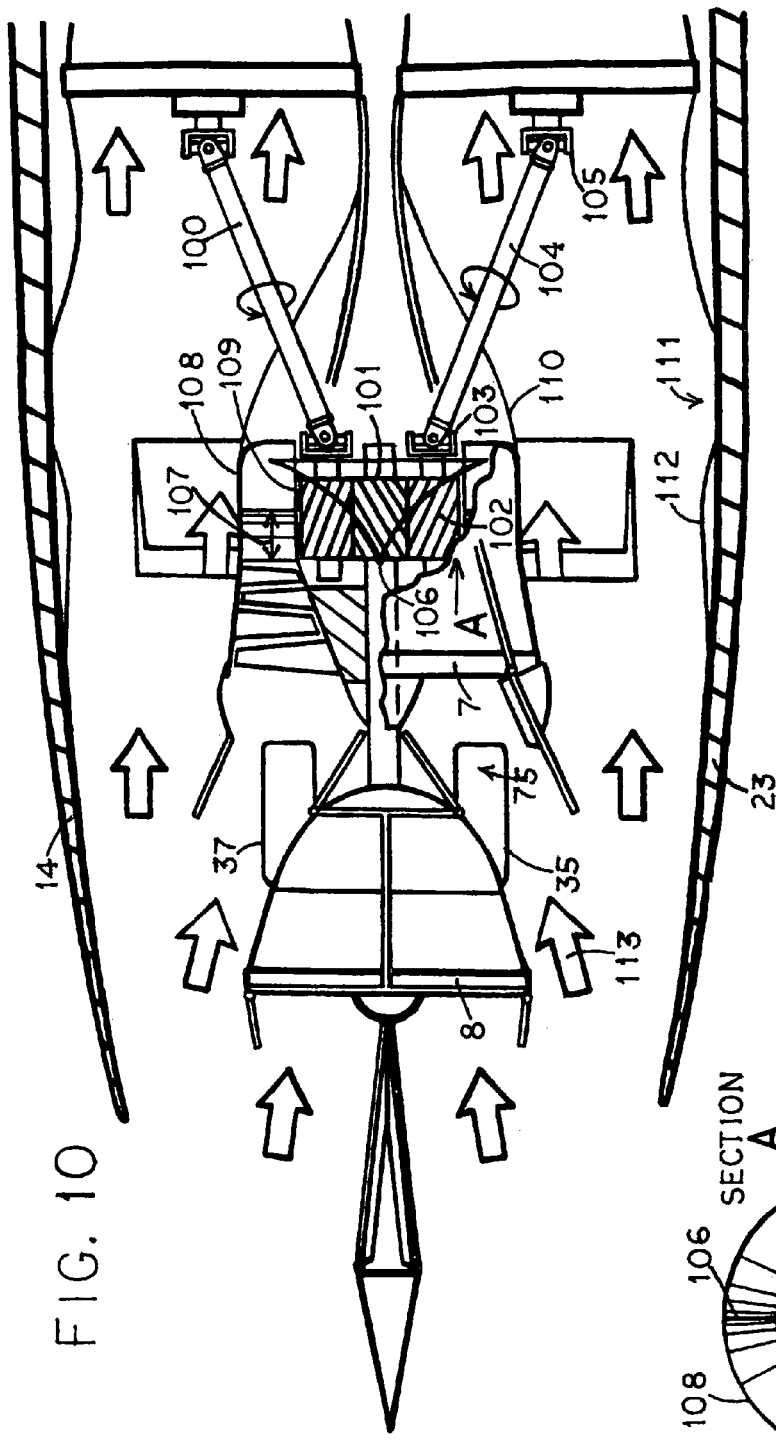
FIG. 10 is a plan view of a nacelle with alternative fan gearing.

FIG. 10 is a re-configuration of FIG. 3 which yields an improvement. The advance requires enlarging the discharge casing of rear fan 7. Outer casing 108 is flared outward from FIG. 3, and inner casing 109 is expanded too. Consequently, pinion 102 et al and central gear 101 can be moved forward. They fit within discharge inner casing 109 because they are slimmer than pinion 32 and central gear 31 of FIG. 3. The advantage is that driveshafts 104 and 100 make less of an angle to the flow. Their drag will be less. The new angle is 21 degrees, compared to 27 in FIG. 3. The lesser angle also means reduced wear on U-joints 103, 105 et al.

Figure 11:
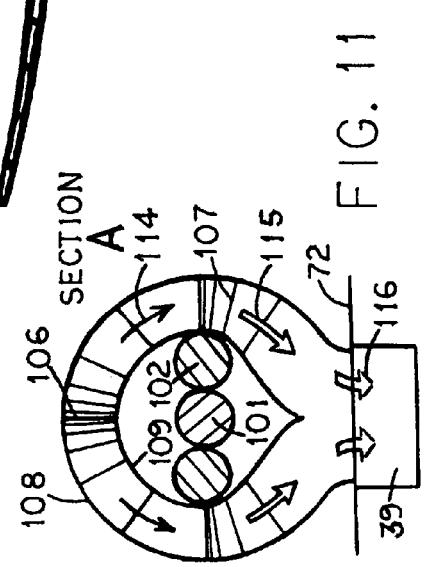
FIG. 11 is a cross section of an alternative fan discharge casing.

FIG. 11 is a cross section of discharge casing 108-109 of FIG. 10 taken at viewing plane "A". In FIG. 11, flow divider 106 splits the fan output and sends it left and right so it can flow downward at the rear of the casing 108-109 annulus. In so doing, the fan output flow curves around inner casing 109. There is also a curved baffle 107 which captures the discharge from the bottom half of rear fan 7. FIG. 10 shows the placement and downward curvature of baffle 107. In FIG. 11, curved baffle 107 sends its captured air 115 downward at the front part of the casing 108-109 annulus. That way discharge flow 114 from the top of rear fan 7 interleaves with discharge flow 115 from the bottom half of rear fan 7 without interference. At the level of nacelle floor 72, flows 114 and 115 join smoothly like confluent streams and form a blended discharge 116. Flow 116 exits the nacelle behind partly open trapdoor 39 to generate forward thrust; similar to previous flow 73 behind trapdoor 39 in FIG. 7.

Airflow Details

In FIG. 10, contouring 112 onto nacelle wall 23 can be provided with an indentation 111 to maintain the passage's flow area at the biggest bulge in streamlining 110.

It may seem that chute 35 is a major intrusion into airflow 113 for rear fan 7. However, flared part 75, also seen in FIG. 7, is low in the airflow passage. Too, there is plenty of intake area to the inside of hinged panel 20 in FIG. 9 for the flow to get by. And when hinged panel 20 in FIG. 2 has closed down, as shown, to the same position as in Concorde for Mach 2 cruise, discharge chute 35 of FIG. 3 will be well inside plenum volume 21, therefore out of the sonic airflow 22.

In FIG. 3, a different way to reduce the angle of driveshafts 6 and 30 is to insert idler gears (not shown) between pinions 32 et al and central gear 31 to make a gear train. Idler gears in a gear train are known in FIGS. 8 and 9 of U.S. Pat. No. 3,161,019.

Turbine Work Re-Check

A brief technical review of the proposal follows. It is suggested to add a low pressure ratio, remote fan driven by the compressor of a turbojet engine. Except for our insertion of a driveshaft this is the save as making a turbofan out of a turbojet. Making turbofans came early in the history of jetliners. Their first engines were the JT3C turbojets. From SAE Paper 710308, also in SAE Transactions, Vol. 80, 1971, page 1296, the intake airflow was about 180 lbs/second. Then a two-stage fan was added in front of the LP compressor, giving the JT3D-3B turbofan (SAE Paper 730346, also in SAE Transactions, Vol. 82, 1973, page 1126.) The new airflow was 460 lbs/second, two and a half times the turbojet's airflow. Yet the 3-stage LP turbine seems to be the same size (comparing FIG. 4 of SAE 730346 to FIG. 1 of SAE 710308.) How is that possible? Part of the answer is that the fan pressure ratio is only 1.75 (Table 2 of SAE 730346), much less than the turbojet pressure ratio of 11.6 (Using P=170 psia from FIG. 1 of SAE 710308 The main part of the answer, however, is altering the thermodynamic cycle: Some of the pressure in the jet pipe is exchanged for more turbine work. That is precisely the method described in FIG. 2's drawing and legend in SAE 730346. This verifies our increased work extraction from the LP turbine before supercharging.

Airflow Distortion

The last check is the effect on air duct airflow 18 of the obstructions represented by streamlining 17 and driveshaft 6 of FIG. 2, plus bulge 83 in FIG. 8. In Fluid Mechanics textbooks, the loss amount caused by bodies of revolution in airstreams is expressed as a fraction of the airflow's velocity head. It's convenient that the loss in supersonic air inlets to military turbojets is also expressed as the drop in velocity head which is part of the total pressure. Therefore, the loss amounts can be compared directly. The loss caused by an airship shape at a Reynolds Number representative of such air inlets (6 million) is 0.06. Since bulge 83 and streamlining 17 of FIG. 8 are semi-circular, the loss would be 0.03. For driveshaft 6 at a shallow angle to the flow (27° or 21°), the 0.06 loss of a streamlined strut perpendicular to the flow should approximate. Average loss=(0.03+0.06)/2=0.045. The distortion pattern is single-lobe because the obstructions are all on the same side of the air duct.

In comparison, at Mach 2.2 the turbojet engine in the F-15 fighter can stand up to 0.08 steady-state inlet total pressure loss, 1.04−0.96 in FIG. 11 of SAE Paper 740824, also in SAE Transactions Vol. 83, 1974, page 2812. This is again for a single-lobe distortion pattern. Then the two situations are comparable, and our amount is smaller, therefore OK.

This situation holds good when the comparison is made to the Concorde's inlet air distortion index at the Olympus front face. FIG. 25 of SAE Paper 710775 (not in SAE Transactions) shows a single-lobe distortion pattern at Mach 2 with a maximum dip of 0.06 from the mean. Our distortion index is below that too.

Design Variations

"Turbojet" usually means a gas turbine engine which produces thrust only, and in which all the intake air passes through the combustion chamber, except that which flows through the turbine blades for cooling. That is the device for the invention. But a slightly different start can be envisioned. A continuous-bleed turbojet is also applicable. It is in effect a turbofan engine of very low bypass ratio: 1.0 or less, usually much less. The advantage here is slightly less fuel consumption at Mach 2 cruise because of the slightly higher mass flow. The best-known example is the J-58 engine in the SR-71 "Blackbird" Mach 3 airplane.

An example in our drawings would be turbojet 3 of FIG. 1 with control valves 5 permanently open as in FIG. 5. Bypass ducts 2 would flow air all the time. Supercharging, if implemented, would fit in the arc of circumference of casing 4 between the bypass ducts 2. In other words, some shorter version of scroll 45 from FIG. 4, but several such scroll segments and several nozzles 42.

It is recognized that the addition of the two large remote fans represents a weight increase which could be impractical, unless modern low-weight composite materials are widely used.

It is also recognized that some current prototype fans may develop pressure ratios significantly above 1.7 in a single stage. Such fans are not excluded. We make the criterion the pressure ratio, however obtained, not the number of stages.

The gearing in FIGS. 3 and 10 is the simplest possible, but other forms can be fitted. We may want to turn smaller fan 8 faster than rear fan 7. Nested shafts rotating at different speeds could replace common shaft 40. Planetary or other gear sets could be used. Then a central gear would be ultimately connected to the fan shaft means by planet gears or layshaft gears. "Central", pertaining to a gear, means collinear with the shaft(s).

The scope of the invention is found in the appended Claims.

The invention claimed is:

1. An engine nacelle assembly for a supersonic aircraft; said engine nacelle assembly comprising a nacelle containing two turbojets and two remote fans; said nacelle located under a wing; said nacelle being substantially an elongated flat box open at both ends; said nacelle having side walls and a floor; said remote fans active only during subsonic flight, especially takeoff, or on the ground;

at the front of said nacelle, a vertical nose piece of substantially isosceles triangular cross section, with the apex pointing forward; starting a short distance behind said nose piece, two long intake air ducts in the front portion of said nacelle; said intake air ducts each feeding a said turbojet; said turbojets housed side-by-side in the rear portion of said nacelle; each said turbojet having a jet pipe connected to an exhaust nozzle; each said turbojet during supersonic flight developing substantially all its power as first forward thrust from jet flow out of a said exhaust nozzle;

two substantially flat surfaces trailing from the base of said nose piece; said flat surfaces movable, being vertically hinged at the sides of said base;

when said aircraft is supersonic, said flat surfaces making an angle greater than the angle of said apex of said nose piece, and together with it forming upright wedge means at the front of said air ducts; said wedge means constituting compression ramps for the high-speed intake airflow;

during supersonic flight, said wedge means dividing said intake airflow substantially in half; one said half angling to the right, the other said half angling to the left; each said half then describing a trajectory within a said air duct; each said trajectory turning slightly as it follows the concave inside of a said side wall; said angling in combination with said turning representing an outward curvature on each said trajectory;

the two said trajectories disposed back-to-back and being close mirror images of each other; said curvatures each creating an unused void at the inside of a said trajectory; said unused voids combining to make an elongated approximately lozenge-shaped volume between said trajectories when viewed from above; said volume containing most of the bulk of said remote fans; said remote fans being in tandem, thereby defining a front fan and a rear fan; the curved said trajectories substantially skirting said remote fans during supersonic flight;

for takeoff, said flat surfaces of said wedge means pivoting inward toward closing behind said nose piece; said closing narrowing said wedge means, to allow some airflow into said front fan; movable panels at the front of said rear fan; said movable panels opening to capture some airflow for said rear fan;

for each said turbojet, a clutch able to engage a rotor of said turbojet's compressor; said clutch disengaged during supersonic flight; said clutch connected to a driveshaft extending forward for turning a pinion; each said pinion meshing with or ultimately powering a more central gear; said more central gear connected to shaft means carrying other rotors; said other rotors being part of said remote fans;

for takeoff, said clutches being engaged, said driveshafts turning, and said shaft means powering said other rotors; said remote fans delivering mildly compressed air discharged backward below said floor for producing second forward thrust, with relatively low noise;

for takeoff, power to turn said remote fans coming from greater work extraction by the low-pressure turbines of said turbojets; said greater work extraction made possible by reduced pressures of the working gases in said jet pipes; said reduced pressures caused by opening said exhaust nozzles beyond the point for maximum turbojet thrust;

said reduced pressures thereby resulting in lower jet velocities issuing from said exhaust nozzles; said lower jet velocities creating third forward thrust of lesser magnitude than if said exhaust nozzles were more closed, but also less noise;

and said third forward thrust complemented by said second forward thrust to achieve takeoff thrust much the same as the maximum native thrust of said turbojets alone.

2. The device of claim 1 and further supercharging a said turbojet, in which said axial compressor is an axial-flow compressor including a casing; a compressor bleed formed substantially as a circumferential ring of openings in said casing; said compressor bleed located before the third stage of said axial-flow compressor, thereby accessing lightly-compressed air;

said compressor bleed applied during cruise flight at supersonic speeds; said compressor bleed diverting a small part of the flow, termed "excess flow", from said axial-flow compressor to the outside of said turbojet; said diverting being controlled by valves; said valves having an open setting during supersonic flight;

said valves having a closed setting during takeoff, thereby blocking said bleed and capturing said excess flow; said excess flow supercharging said turbojet, which develops more shaft power; the additional said shaft power helping during takeoff to drive the load of said remote fans when their pressure ratio is 2:1 or more.

3. The device of claim 2 during supersonic flight, in which said excess flow leaving said casing is collected by a scroll fixed to the outside of said casing downstream of said compressor bleed; said scroll connecting to a warm-air nozzle located just outside a said side wall of said nacelle; said warm-air nozzle recovering as thrust some of the work of compressing said small part of the flow, without needing to enlarge said exhaust nozzle to pass said excess flow during supersonic flight.

4. The device of claim 2 in which said valves include a plurality of small cylinders disposed around said casing at one axial station; said cylinders being circumferentially aligned so that they can be gang-turned by a flexible cable passing through said cylinders; said cylinders each carrying one flap; each said flap being tangential to a said cylinder; each said flap rotating outward along with its cylinder toward said open setting; at other times, each said flap rotating inward along with its cylinder toward said closed setting; said flaps thereby forming smooth covers for said openings of said compressor bleed.

5. The device of claim 1 during supersonic flight, in which said intake air ducts include fixed subsonic diffuser walls aft of said hinged panels; said nacelle is enclosed at the top by said wing or a boundary layer splitter; said elongated approximately lozenge-shaped volume being substantially bounded at the front by said wedge means, and at the rear substantially by said hinged panels and by said subsonic diffuser walls;

a lengthwise break on each side of said volume; said breaks located between the rear of said wedge means and the front of said hinged panels; said breaks being access of air to a plenum between said remote fans; said air coming from said intake air ducts;

first fixed dam across said plenum and defining the latter's forward extent at the front face of said front fan; second, movable dams across the rear part of said plenum and defining the latter's rearward extent somewhat ahead of said rear fan; said movable dams reaching the inside of said hinged panels to seal thereupon;

and "T"-shaped third, fixed, dam bridging the gaps between said first dam and said second dams to seal therewith; said "T" dividing said plenum into two substantially equal spaces; said spaces being back-to-back across the length of said "T";

each said intake air duct communicating with one, and only one, said space; each said space providing room for flow adjustment for the airflow within a said intake air duct.

* * * * *